Patented Apr. 28, 1953

2,636,829

UNITED STATES PATENT OFFICE 2,636,829

PROTEIN EMULSION COATING COMPOSITION

Richard G. Smith, Harvey, and Carl S. Vestling, Urbana, Ill., assignors to Sherwin-Williams Company, Cleveland, Ohio, a corporation of Ohio No Drawing. Application September 27, 1949, Serial No. 118,192

10 Claims. (Cl. 106—123)

This invention relates to water-reducible emulsion-type coating compositions containing proteins which are soluble in aqueous alkaline solutions but glycerine insoluble, and more particularly, to an improvement in such compositions which promotes water and wash resistance of films formed from such coating compositions upon contact with the oxygen of the air after deposition in a film.

Emulsion type coating compositions stabilized with aqueous dispersions of proteins, particularly casein, are in extensive use due to their many desirable properties. One unsatisfactory characteristic of water-reducible protein-containing coatings, even when fortified by emulsification of drying oils and resins in their composition, is the unsatisfactory resistance of the dry films to the elements and to repeated washings with soap and water.

Formaldehyde and other aldehydic compounds have been used heretofore to harden proteins but are unsatisfactory for use where mixing must occur at a time long prior to the time of use. This is for the reason that aldehydes cannot be stored in direct contact with the aqueous protein of the paint system, as a reaction proceeds between the aldehyde and the protein until the packaged paint composition is no longer of utility due to formation of an unreducible gel within the package. For this reason aldehydes can only be used a very short time before application of the protein-containing paint, and are not equivalent to quinones as hereinafter described.

One of the objects of this invention is to provide new and improved protein type coating compositions which form relatively hard washable films.

A further object is to provide a water reducible protein-containing coating composition which only hardens upon exposure to air and does not gel while in a substantially anaerobic condition such as is found during storage of the coating compositions in filled, air-tight containers.

Another object is to provide a new and improved method of producing such compositions. Other objects will appear hereinafter.

These objects are accomplished by providing a water dispersible protein-containing film forming composition containing at least one condensing agent capable of multiple condensations with the amino groups of the proteins after the composition has been applied in relatively thin coating and is in the presence of oxygen to form substantially water insoluble, permanent coatings. So long as the composition is "en masse" under anaerobic condition in the case of pastes only primary condensation at most occurs.

In the preferred practice of the invention, an emulsion of the oil-in-water type is prepared containing a quinone, a hydrophobe disperse phase, e. g., a drying oil, and/or an oil-modified resin, and/or an elastomer, and a continuous aqueous phase containing casein dissolved or dispersed in water with the aid of solubilizing agents such as organic or inorganic bases, either singly, or in conjunction with other casein-like vegetable proteins obtained from seeds and cereal grains, e. g., soya bean protein and corn protein. By the term "quinone" is meant an organic cyclic dioxy ring compound containing six or more carbon atoms in a carboxylic ring, said compound being capable of undergoing diene addition, and two of said ring carbons being attached through double bonds to oxygen atoms. The principal quinones are the benzoquinones, the naphthoquinones, and the anthraquinones, all of which are effective for the purpose of this invention.

Other illustrations of quinones suitable for the practice of the invention are retene quinone and similar oxidized multiple ring compounds.

We have also found the reduced form of the above described quinones (hydroquinones) to be of value. These materials are somewhat slower in action, for they apparently are first oxidized to the quinone before condensations take place.

The proteins useful in stabilizing oil-in-water emulsion systems are for all practical purposes limited to the proteins soluble in aqueous alkaline solutions but insoluble in glycerine which specifically exclude gelatines (and glues derived from gelatine) obtained by digestion of hides, bones, hooves, etc. The preferred protein is milk casein, although other proteins of a casein-like nature obtained from vegetable seeds may be used as partial substitution for the casein where economies indicate this be done. The useful partial substitutes for casein include corn protein, soya bean protein, detoxified castor bean protein and flax proteins, and are characterized by being water soluble or dispersible when acted upon by organic or inorganic bases. Gelatines have insufficient protective colloidal value to be particularly useful in emulsion type coating compositions, as compared with the glycerine insoluble proteins described. The term "glycerine insoluble protein" as used herein refers particularly to casein and casein partially supplanted with casein-like proteins above described arising from vegetable seed sources. Tests indicate that at least a part of the alkali soluble protein must be casein in order that the additional increment of durability of the coatings herein described be obtained by the inclusion of quinones. The more nearly the vegetable proteins approach casein in respect to carboxyl and amino groups in the structure, the more suitable they become for the purposes of the herein described invention.

Other ingredients may be present in the composition, too. For example, preservatives, stabilizers, pigments, plasticizers, driers, both fixed and volatile organic and inorganic bases can be added.

The term "oil" as used in the expression "oil-in-water type emulsion" and as generally referred to in this specification is used in the sense in which it is employed in emulsion technology, and refers to the non-water soluble part of the emulsion system, i. e., the "oil phase." The "oil phase" is meant to be inclusive of those viscid organic hydrophobic materials capable of forming solid films and refers in particular to both natural and synthetic resins (e. g., alkyd resins and phenolic resins) and their modifications, either alone or compounded with suitable unsaturated oils such as linseed, soya, dehydrated castor, and/or tall oil, bodied and/or refined natural or synthetic oils, water-insoluble plasticizers, the disperse phase of emulsion copolymers including those formed in emulsion systems as well as copolymers emulsified after formation (e. g., styrene-butadiene emulsion copolymers and emulsions of styrene-butadiene copolymers). Compounds of the class above described shall be hereinafter referred to generically as "viscid organic hydrophobes" being capable of forming solid films upon deposition from oil-in-water emulsion systems.

When drying oils or oil-modified resins constitute the disperse phase, we prefer to disperse the quinone in them prior to their emulsification in an aqueous phase. When the composition is already emulsified, as in the case of an emulsion copolymer, a water-insoluble plasticizer may be used to carry the added quinone into the composition.

The introduction of this invention in the art of manufacture of protein-containing water reducible resin-emulsion paints increases their durability so that applications beyond their present limitations are possible.

To measure improvement in wash resistance of water reduced protein containing coatings, we have devised an empirical number identified as the wash index value. This number is closely related to the speed of conversion of the protein-containing emulsion type film to an irreversible insoluble form, hence to soap and water abrasion resistance, and the total service that may be anticipated from the applied coating.

The instrument used to obtain the data can be described as follows:

To the bottom of a brass ring of eight inch inside diameter and ten inch outside diameter, approximately one-half inch thick is fastened a rubber washer of the same size as the ring.

Mounted on the top of the ring is a broad inverted U-shaped brass frame support, the height of the U being five and one-fourth inches above the top of the brass ring.

The distance between the legs of this frame is the same as the outside diameter of the ring. The strip forming this frame is two inches wide by $\frac{3}{32}$ inch thick.

In a hole directly above the center of the ring through the center of the inverted broad U-frame guides is a brass shaft of one-half inch diameter. Topside of the frame on said shaft is a five inch throw crank which, when turned, causes a cradle mounted on the bottom end of the shaft and within the circumference of the brass ring to rotate freely. A four pound brass weight, made principally from a half section of a three inch diameter brass cylinder approximately two and one-half inches long is so constructed as to ride freely in the cradle with only its own weight exerting downward pressure along its rounded section against and upon whatever surface the instrument is placed.

The weight is fitted with clamps mounted on its horizontal surface so that a sponge rubber pad and cloth can be wrapped about the cylindrical area and securely fastened to withstand the frictional pull developed between the test surface and the weight. A mechanical counter tabulates the revolutions of the weight against the test surface.

The procedure for determing the wash index value is as follows:

A twelve inch by twenty-four inch Upson board panel is double coated under standard conditions of reduction and film weight, with the water reduced protein coating under test.

After five days of drying, the above described instrument is placed with the rubber washer against the panel. A strip of cloth, cut from commercially available wipers, is wrapped over the sponge rubber pad and both are tightly clamped to the cylindrical half of the area of the weight. The weight is then mounted in the cradle and the cloth is in direct contact with the test surface.

One ounce of 1% Ivory soap is poured within the ring area and the test area is washed by turning the crank. The operator continues this motion until the film coating is sufficiently removed in any one spot to reveal the Upson board base. The number of revolutions before the paint film breaks is recorded.

The test is made at five days, fifteen days and thirty days of drying upon different areas of the coated panel.

At the end of thirty days we have a set of three numbers revealing the general durability of the experimental coating. Usually, these numbers increase in value with age as the film loses volatile matter, oxidizes, polymerizes and undergoes condensations. The better the protein-containing coating, the higher will be each succeeding value in the set of wash tests. In evaluating the results, more weight is given to the fifteen day test than the five day, and more to the thirty day test than the fifteen day value.

Our wash index value is derived by weighting the test data. This is done by adding the five day break number to twice the fifteen day break number plus four times the thirty day break number. The total is then divided by seven. This gives us a single number evaluation of a film under test which can be used for comparisons.

Materials and methods for the formulation and manufacture of water-reducible protein stabilized resin-emulsion type coating compositions are well known, as attested by the great number of brands of this type of coating composition available today. They are further useful as textile coatings, printing inks, and the like.

As illustrations, several specific examples follow, but do not limit the scope of the invention, as other materials and methods will be apparent to those skilled in the art from the description herein given.

EXAMPLE I

*Preparation of a casein solution (A)*

To 3200 lbs. of warm water in a jacketed kettle add 5 lbs. of octyl alcohol to prevent foam, and 600 lbs. of acid precipitated casein, and allow to soak 10 minutes with good agitation.

Then add 60 lbs. of preservative (e. g., sodium orthochlorophenate and sodium pentachlorophenate) and 30 lbs. of phenol. Heat to 140° F., and then add 75 lbs. of a 10% caustic soda solution. Heat to 170° F., hold at this temperature for 15 minutes and then add 38 lbs. of 28% ammonium hydroxide. The dispersion resulting has a pH of approximately 8.5.

EXAMPLE II

*Preparation of a soya protein dispersion (B)*

To 3250 lbs. of cool water add 700 lbs. of soya bean protein in a jacketed kettle, heat to 140° F., and hold at this temperature for 10 minutes while the protein is thoroughly agitated and wetted.

To this slurry add 250 lbs. of rosin and 60 lbs. of preservatives, (Dowicides A and G). After some 10 minutes add 395 lbs. of caustic soda solution of 10% strength, heat the slurry to 170° F., and hold at this temperature for 10 minutes. Add 30 lbs. additional phenol and the soya bean dispersion is ready for use. The pH of this solution is about 9.6.

EXAMPLE III

*Preparation of a corn protein dispersion (C)*

To 3200 lbs. of water, in a steam jacketed kettle add 700 lbs. of corn protein (such as American Maize Maco H) and 60 lbs. of preservative e. g., sodium orthochlorophenate and sodium pentachlorophenate. American Maize Maco H is a corn protein consisting of approximately 35% Zein, globulins and glutalins, above 10% of acetone extractables, about 1% of water soluble sugars, approximately 5% of undetermined matter, probably fibre, and a total available protein content of from 70% to 75%. Heat the batch under agitation to 150° F. to 160° F., for 15 minutes and then add 250 lbs. of gum rosin and 75 lbs. oleic acid. After several minutes add 345 lbs. of a 10% aqueous caustic soda solution and heat on up to 190° F., for about 20 minutes. Add 30 lbs. of phenol and 20 lbs. of 28% ammonium hydroxide. This will give a dispersion having a pH close to 8.5. Draw off for use in the paint to be made as described in the subsequent examples.

EXAMPLE IV (1) In a change can mixer add 125 lbs. of casein dispersion A, 200 lbs. of soya bean dispersion B, and 150 lbs. of water and mix thoroughly.

While the agitator is in operation, add 200 lbs. of titanium dioxide, 100 lbs. of oxide free calcium carbonate, six lbs. of Nacconol N. R. S. F., 100 lbs. of clay, 50 lbs. mica, 50 lbs. of Celite, and 50 lbs. of pyrophyllite. Stir until a uniform appearance is obtained. Nacconol N. R. S. F. is a sodium alkyl aryl sulfonate. "Celite" is a diatomaceous earth.

(2) 200 lbs. of a varnish binder made of 3 parts of heat bodied linseed oil and one part of ester gum are heated until the gum is solubilized in the oil, and 1/16 lb. of benzoquinone is dispersed in the oil while the oil is warm. 4 lbs. of 6% cobalt naphthenate and 2 lbs. of 24% lead naphthenate are added and dispersed in the oil.

To the pigment-protein dispersion of (1), add the oil phase (2) slowly with agitation. After all the oil is added the batch is shaded to color and passed over a roller mill to a heat jacketed storage, where the material is pasteurized, and the resultant oil-in-water emulsion is filled into containers while hot. The containers are closed. Upon cooling, a partial vacuum is created in the free air head space of the container.

EXAMPLE V

The process of Example IV is repeated except 250 lbs. of casein solution replaces all protein solutions and 225 lbs. of water replaces the 150 lbs. of Example I.

EXAMPLE VI (1) In a change can mixer 437 lbs. of casein solution (A), 300 lbs. of water and 10 grams of Nacconol were weighed in. After some agitation 500 lbs. of titanium dioxide were added and the pigment dispersed.

(2) To 300 lbs. of a 25 gallon length estergum, bodied linseed oil were added 3/4 lb. benzoquinone, 6 lbs. of 6% cobalt naphthenate and 3 lbs. of 24% lead naphthenate.

The oil phase (2) was stirred well while warm to disperse its components and then added slowly to the pigment protein dispersion of (1). Additional ammonia was added to bring the pH up to 8.5 and the batch passed over a roller mill.

If the quinone is dispersed in the protein solution, the color of the product will be darker, and because some of the quinone is reduced to the hydroquinone, it will require a longer time for the film to develop latent water resistant qualities.

EXAMPLE VII (1) In a change can mixer, weigh in 250 lbs. of casein solution (A) and 225 lbs. of water. As the agitator mixes the ingredients, add the following: 200 lbs. of titanium dioxide, 100 lbs. of calcium carbonate, 100 lbs. of clay, 6 lbs. of Nacconol, 50 lbs. of Celite, 50 lbs. of mica, 50 lbs. of pyrophyllite and mix the whole thoroughly.

(2) To 200 lbs. of a heat bodied linseed oil (bodied to a Gardner-Holdt viscosity of about $Z_4$-$Z_5$), add 0.3 lb. of anthraquinone and heat the whole mixture slightly to dissolve the quinone. Add 5 lbs. of 6% cobalt drier and 2 lbs. of 24% lead drier and thoroughly disperse them in the oil.

(3) Add (2) to (1) with agitation, adjust the pH to 8.5 with ammonia, and pass the whole mixture over a roller mill.

The wash index value of the same composition but without quinone, called the control, ran 392. The above composition gave a wash index value of 639.

EXAMPLE VIII

The procedure was the same as Example VII except that the quinone used was B-chlor anthraquinone. The wash index value was 701.

EXAMPLE IX

The procedure was the same as Example VII except that the quinone used was 2-amino anthraquinone. The wash index value was 620.

EXAMPLE X

The procedure was the same as Example VII except that the quinone used was technical dihydroxy anthraquinone (65% 1,5 dihydroxy anthraquinone, 35% 1,8 dihydroxy anthraquinone). The wash index value was 685.

EXAMPLE XI

The procedure was the same as Example VII except that the quinone used was 1,2 naphthoquinone. The wash index value was 556.

EXAMPLE XII

The procedure was the same as Example VII except that the quinone used was tolu-p-quinone. The wash index value was 530.

EXAMPLE XIII

The procedure was the same as Example VII except that the quinone used was sodium anthraquinone B-sulfonate. The wash index value was 424.

EXAMPLE XIV

The procedure was the same as Example VII except that the quinone used was bromo hydroquinone. The wash index value was 425.

EXAMPLE XV

The procedure was the same as Example VII except that the quinone used was thymoquinone. The wash index value was 418.

EXAMPLE XVI

The procedure was the same as Example VII except that the quinone used was 2,5 dichlorobenzoquinone. The wash index value was 473.

EXAMPLE XVII

The procedure was the same as Example VII except that the quinone used was chloranil. The wash index value was 463.

EXAMPLE XVIII

In some cases a protein, such as casein, is used to stabilize the emulsion co-polymer especially when it is desirable to pigment the emulsion co-polymer. A quinone could be added to these systems, either as a component of the plasticizer added, or in a small portion of a solvent for the quinone. This quinone could be added prior to the protein or after the protein. The following example is illustrative.

Sixty (60) lbs. of water, 80 lbs. iron oxide and 2 lbs. of octyl alcohol were dispersed in a ball mill with 12 lbs. of rosin soap and 50 lbs. of casein solution. After thorough pigment dispersion 0.25 lb. 2-amino anthraquinone was dissolved or dispersed in 15 lbs. of a plasticizer such as tri-cresyl phosphate and added to the pigment dispersion with stirring. Five (5) lbs. of 26% ammonia was added and followed with 500 lbs. of a styrene-butadiene emulsion co-polymer of about 45% solids containing emulsifying agents and additional proteinaceous material (e. g., Dow X-512 co-polymer, a stabilized emulsion co-polymer of styrene and butadiene containing proteinaceous material as a part of the stabilizing agent).

It will be observed that we employ both substituted and unsubstituted quinones. Attention to the selection of the proper quinone beyond economic consideration is necessary, for it is known that substituent groups in certain positions modify the oxidation-reduction potential of quinones, and the more complete the substitution, the less the number of reactive groups available for condensations.

The Dowicide A and Dowicide G are sodium salts of chlorinated phenols made by the Dow Chemical Company. Other preservatives such as thymol and sodium benzoate can be used.

The proportions of the quinone may vary but are preferably within the range of 0.01% to 12% of the dry weight of the protein contained in the coating composition. In most instances, approximately 0.3% of a quinone on the dry weight of the protein gives good results in increasing the wash resistance. The amounts used will vary depending upon the prior history of the protein, the number of available amino groups present in the protein and the molecular weight of the quinone body.

While the invention is not limited to any theory, it is believed that the quinone reacts with an amino group in the protein to form an amino-hydroquinone and then by atmospheric oxidation after the coating composition is applied, the amino-hydroquinone is oxidized to an amino-quinone which can take up a second molecule of amine. Further oxidation takes place by atmospheric oxidation and through repeated steps more amino groups are chemically combined.

As a further illustration of the advantages of using our invention, the wash index values, which were recorded before adding quinones, averaged under 100. The first formulation employing the discovery gave a wash index value exceeding 300, with a thirty day test running as high as 500 rubs with no breaks showing.

A sample of a well known resin-emulsion coating obtained on the open market known to contain no casein as a part of its protein content was weighed out into two aliquot portions of 2500 parts each. One part of anthraquinone was dissolved in 25 parts of varnish vehicle similar to that described in Example IV and dispersed in the first aliquot portion. Twenty-five (25) parts of the same varnish without added quinone was dispersed in the second aliquot portion. Wash index values obtained indicated that there was considerably less effect from the quinone added than had been experienced where casein formed a part of the protein component. Good results were obtained when the protein component consisted of casein and alpha protein.

The relative proportions of the ingredients forming the continuous and disperse phases of the emulsion coating compositions may vary depending upon the type of coating desired. In general, the oil phase will constitute 0.2 to 4 pounds, preferably 1.0 to 2.0 pounds, of oil per gallon of the emulsion, the remainder being the aqueous phase, irrespective of any pigments added. The larger quantities of oil are normally employed for glossy emulsion coatings than for flatter types of coatings. In some cases, the pigments employed will be in the aqueous phase and in other cases they will be in the oil phase. The quantity of protein may be varied, e. g., within the range from 0.25 to 0.75 pound of protein per gallon of emulsion coating composition.

This case is a continuation-in-part of U. S. application Serial Number 671,120, filed May 20, 1946, now abandoned.

The invention is hereby claimed as follows:

1. An oil-in-water emulsion coating composition comprising essentially an aqueous alkaline continuous phase in which is dissolved a protein soluble in aqueous alkaline solutions but insoluble in glycerine, said protein comprising casein, a discontinuous oil phase capable of forming a solid film when the emulsion is applied as a coating to a surface and dried aerobically, and a quantity of a quinone effective to increase the wash fastness of the resulting coating.

2. A water thinnable emulsion coating composition comprising an aqueous alkaline dispersion of casein in the continuous phase, a disperse phase consisting essentially of a viscid organic hydrophobe capable of forming a solid film when said emulsion is applied as a coating to a surface and dried aerobically, and about 0.01% to 12% by weight, based upon said casein, of a quinone.

3. An oil-in-water emulsion coating composition comprising a continuous phase consisting essentially of an aqueous alkaline dispersion of casein and another glycerine insoluble protein of vegetable origin which is soluble in aqueous alkaline solutions, a disperse phase consisting essentially of a viscid organic hydrophobe capable of forming a solid film when said emulsion is applied as a coating to a surface and dried aerobically, and about 0.01% to 12% by weight, based upon said proteins, of a quinone.

4. A water thinnable emulsion coating composition comprising an aqueous alkaline dispersion of casein in the continuous phase, a disperse phase consisting essentially of a viscid organic hydrophobe capable of forming a solid film when said emulsion is applied as a coating to a surface and dried aerobically, and about 0.01% to 12% by weight, based upon said casein, of a benzoquinone.

5. A water thinnable emulsion coating composition comprising an aqueous alkaline dispersion of casein in the continuous phase, a disperse phase consisting essentially of a viscid organic hydrophobe capable of forming a solid film when said emulsion is applied as a coating to a surface and dried aerobically, and about 0.01% to 12% by weight, based upon said casein, of a naphthoquinone.

6. A water thinnable emulsion coating composition comprising an aqueous alkaline dispersion of casein in the continuous phase, a disperse phase consisting essentially of a viscid organic hydrophobe capable of forming a solid film when said emulsion is applied as a coating to a surface and dried aerobically, and about 0.01% to 12% by weight, based upon said casein, of an anthraquinone.

7. A water thinnable emulsion coating composition comprising an aqueous alkaline dispersion of casein in the continuous phase, a disperse phase consisting essentially of a viscid organic hydrophobe capable of forming a solid film when said emulsion is applied as a coating to a surface and dried aerobically, and about 0.01% to 12% by weight, based upon said casein, of p-benzoquinone.

8. A water thinnable emulsion coating composition comprising an aqueous alkaline dispersion of casein in the continuous phase, a disperse phase consisting essentially of a viscid organic hydrophobe capable of forming a solid film when said emulsion is applied as a coating to a surface and dried aerobically, and about 0.01% to 12% by weight, based upon said casein, of beta chlor anthraquinone.

9. A water thinnable emulsion coating composition comprising an aqueous alkaline dispersion of casein in the continuous phase, a disperse phase consisting essentially of a viscid organic hydrophobe capable of forming a solid film when said emulsion is applied as a coating to a surface and dried aerobically, and about 0.01% to 12% by weight, based upon said casein, of 1,2 naphthoquinone.

10. An aerobically preserved stable pigmented oil-in-water emulsion coating composition comprising an aqueous alkaline dispersion of casein in the continuous phase, a disperse phase containing a viscid organic hydrophobe capable of forming a solid film upon deposition from said disperse phase and drying under aerobic conditions with said casein to form a coating, and a quantity of a quinone within the range of about 0.01% to 12% by weight, based upon said casein, effective to increase the wash fastness of the resultant coating.

RICHARD G. SMITH.
CARL S. VESTLING.

References Cited in the file of this patent

UNITED STATES PATENTS

| Number | Name | Date |
|---|---|---|
| 790,821 | Dunham | May 23, 1905 |
| 1,692,389 | Schwarz | Nov. 20, 1928 |
| 1,752,580 | Snell | Apr. 1, 1930 |
| 2,262,771 | La Piana | Nov. 18, 1941 |
| 2,368,516 | Bour | Jan. 30, 1945 |
| 2,379,402 | Scholz | June 26, 1945 |
| 2,433,783 | Paterek | Dec. 30, 1947 |